United States Patent
Johnson

(10) Patent No.: US 12,102,213 B2
(45) Date of Patent: Oct. 1, 2024

(54) ENHANCED HAIR COVERING

(71) Applicant: Albert Johnson, Austin, TX (US)

(72) Inventor: Albert Johnson, Austin, TX (US)

( * ) Notice: Subject to any disclaimer, the term of this patent is extended or adjusted under 35 U.S.C. 154(b) by 453 days.

(21) Appl. No.: 17/337,245

(22) Filed: Jun. 2, 2021

(65) Prior Publication Data

US 2022/0386752 A1 Dec. 8, 2022

(51) Int. Cl.
*A45D 8/40* (2006.01)
*A42B 1/019* (2021.01)
*A42B 1/045* (2021.01)
*A42B 1/12* (2006.01)
*B32B 3/02* (2006.01)
*B32B 5/02* (2006.01)
*B32B 7/12* (2006.01)
*B32B 25/10* (2006.01)
*B32B 25/12* (2006.01)
*B32B 25/20* (2006.01)

(52) U.S. Cl.
CPC ............... *A45D 8/40* (2013.01); *A42B 1/019* (2021.01); *A42B 1/045* (2013.01); *A42B 1/12* (2013.01); *B32B 3/02* (2013.01); *B32B 5/02* (2013.01); *B32B 7/12* (2013.01); *B32B 25/10* (2013.01); *B32B 25/12* (2013.01); *B32B 25/20* (2013.01); *B32B 2262/08* (2013.01); *B32B 2307/51* (2013.01); *B32B 2307/7265* (2013.01); *B32B 2437/04* (2013.01)

(58) Field of Classification Search
CPC .. A45D 8/40; A42B 1/12; A42B 1/019; A42B 1/045; A42B 1/18; A42B 1/018; A63B 33/00
See application file for complete search history.

(56) References Cited

U.S. PATENT DOCUMENTS 799,355 A * 9/1905 Pfeiffer ..................... A42B 1/12
2/68
1,363,408 A * 12/1920 Guinzburg ............... A42B 1/12
2/68

(Continued)

FOREIGN PATENT DOCUMENTS

DE 3022171 A1 * 12/1981 ............... A42B 1/12
GB 2314757 A * 1/1998 ............... A42B 1/12

OTHER PUBLICATIONS

Machine Translation (German to English) of DE 3022171A1 Description. Accessed from EPO on Aug. 17, 2023. (Year: 2023).*

(Continued)

*Primary Examiner* — Clinton T Ostrup
*Assistant Examiner* — Brianna T. Duckworth
(74) *Attorney, Agent, or Firm* — Eversheds Sutherland (US) LLP

(57) ABSTRACT

Devices, systems, and apparatuses are provided for enhanced hair covering. An enhanced covering device may include a first outer layer made of a first material type. The enhanced covering device may include a second inner layer disposed inside the first layer, wherein the second layer is made of a second material type. The enhanced covering device may include an elastic band situated on an interior of the hair covering device at a first edge, wherein the elastic band permits air out of the hair covering device while preventing air from flowing back into the interior of the hair covering device.

18 Claims, 4 Drawing Sheets

(56) References Cited

U.S. PATENT DOCUMENTS

| | | | | |
|---|---|---|---|---|
| 2,505,359 A * | 4/1950 | Hurt | ............ | A42B 1/12 |
| | | | | 2/68 |
| 2,549,376 A * | 4/1951 | Hurt | ............ | A42B 1/12 |
| | | | | D2/867 |
| 3,051,960 A * | 9/1962 | Rendulich | ........ | A42B 1/12 |
| | | | | D2/867 |
| 2015/0047098 A1* | 2/2015 | Pickett | ......... | A42B 1/18 |
| | | | | 2/181 |
| 2021/0361013 A1* | 11/2021 | Pickett | ......... | A42B 7/00 |
| 2022/0338590 A1* | 10/2022 | Moore | .......... | A42B 1/049 |

OTHER PUBLICATIONS

JoAnn Fabrics, Elastics Guide, 2012, https://www.joann.com/on/demandware.static/Sites-JoAnn-Site/Sites-joann-project-catalog/-/images/hi-res/project/pdf/023507P2ElasticsGuide.pdf. Accessed on Aug. 22, 2023. (Year: 2012).*

Definition of "consecutive" from Dictionary.com online dictionary. Accessed May 14, 2024 from https://www.dictionary.com/browse/consecutive (Year: 2024).*

\* cited by examiner

ENHANCED HAIR COVERING

TECHNICAL FIELD

This disclosure relates to methods, systems, and devices for enhanced hair covering.

BACKGROUND

People increasingly use clothing and wearable accessories to express themselves. A variety of hair accessories exist for fashion and function, such as keeping hair out of a person's face or eyes. The position of hair accessories designed to hold a person's hair in place may depend on the hairstyle and type of hair that a person has, so some hair products may not be ideal for display when worn by some people because of the required orientation of a hair accessory to perform its intended function.

Figure 1:
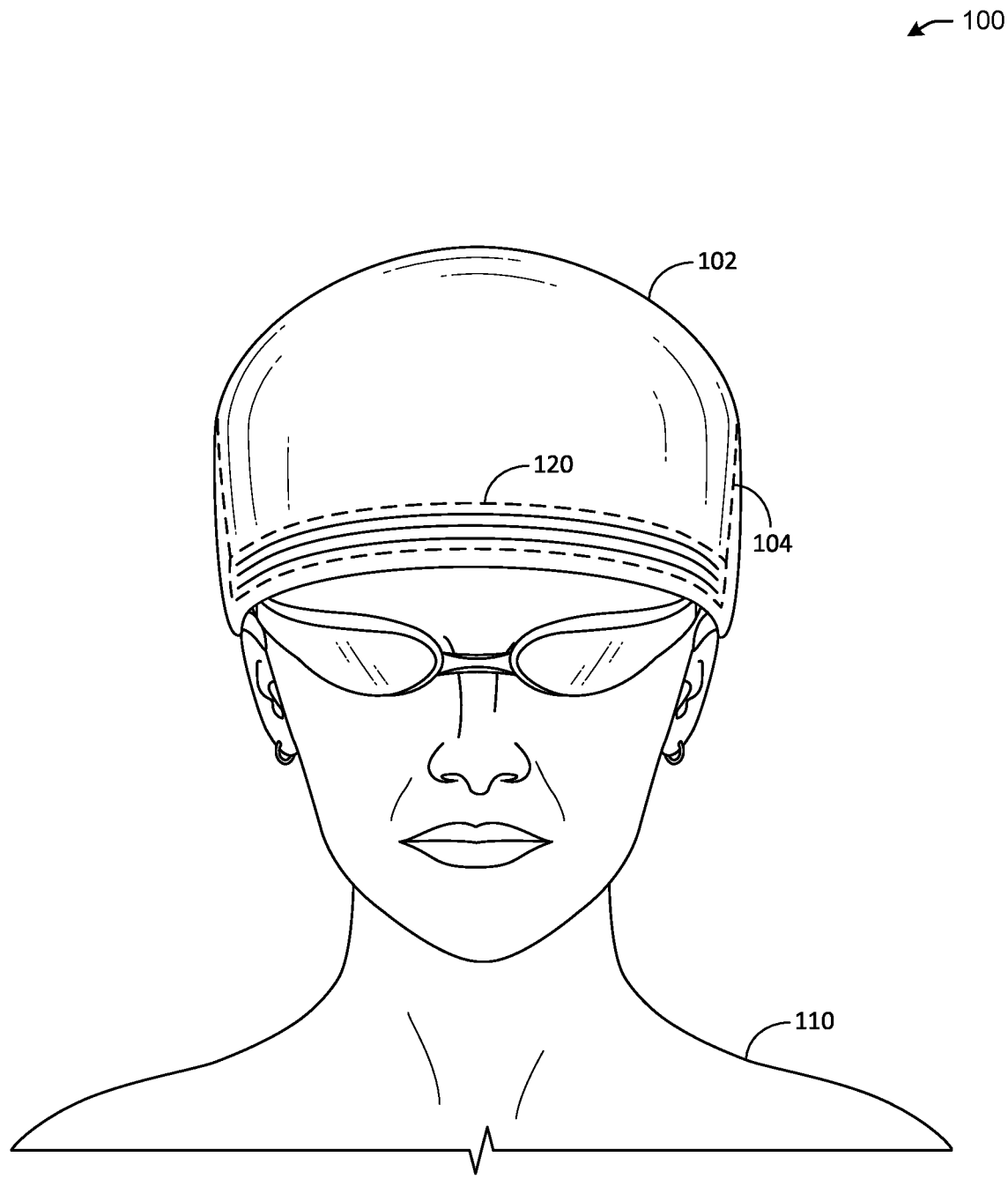
FIG. 1 depicts an illustrative schematic diagram for enhanced hair covering, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Most shower, bathing, and swim caps do not provide the protection necessary to truly protect the hair. Many caps do not provide protection at a high enough level to enjoy being in the water. Swimming caps provide protection from the water, but the latex material harms the hair and makes it extremely hard to put on and take off. Satin or silk-lined caps keep the hair from being damaged but do not truly protect the hair or head from getting wet.

Example embodiments described herein provide certain systems, methods, and devices for enhanced hair covering.

In one or more embodiments, an enhanced hair covering system may deliver a product that protects the hair from water while also providing the protection many materials do not provide when using latex or silicone.

In one or more embodiments, an enhanced hair covering system may provide a way for people to keep their hair dry and still be able to participate in water activities. Some examples of water activities may include, but are not limited to, water sports, showers, or other water activities.

In one or more embodiments, an enhanced hair covering system may leverage a proven material on the outside, comfort lining on the inside, and using a ribbed edging in order to achieve the above.

In one or more embodiments, an enhanced hair covering system may provide suction capability, so the product is airtight against the head, or hair of the user.

In one or more embodiments, an enhanced hair covering system may enhance the process of placing a head covering (e.g., a swim cap, hair bonnet, wrap scarf, etc.) and may allow for easy placement of the head covering to eliminate or minimize damage to a user's hair that may be caused by the current head coverings that exist today. In addition, the current head coverings do not prevent air or water from coming into the user's hair from under the head covering.

In one or more embodiments, an enhanced hair covering system may provide a level of comfort that is unmatched by competing products by allowing the user to squeeze the air out of the head covering in order to make it skin tight and to ensure a higher level of protection. The enhanced hair covering system may be designed to provide suction-like protection that ensures the top of the head stays dry, and a soft lining that is comfortable and truly protects the hair from damage.

In one or more embodiments, the enhanced hair covering system may comprise various layers (e.g., exterior and interior layers) and an elastic band. For example, the exterior of the enhanced hair covering system may be made of a material such as silicone, latex, rubber, malleable plastic, leather, or other waterproof material that can be shaped into a head covering. The interior of the enhanced hair covering system may be made of material that provides a comfort level when placing the enhanced hair covering system on a person's head. For example, the material may be silk, satin, cashmere, wool, cashmere, or any type of material that provides a soft feel and insulation. Because of the softness of the interior layer, a user may be able to put the enhanced head covering on their head with ease and comfort and not cause hair pulling or discomfort. The elastic band generates an airtight fitting when used by a person.

Therefore, people may benefit from the ability to increase the applicability of a head covering and the airtight protection to prevent water from seeping under the head covering and causing air damage and less comfort.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 depicts an illustrative schematic diagram for enhanced hair covering, in accordance with one or more example embodiments of the present disclosure.

Referring to FIG. 1, there is shown an enhanced hair covering 100 placed on the head of a user 110 to cover the hair of the user 110. The enhanced hair covering 100 may comprise one or more layers. The one or more layers may comprise an interior layer 104, an exterior layer 102. In some examples, the interior layer 104 may be a lining of the exterior layer 102. In some other examples, there may be an intermediate layer connecting the exterior layer 102 and the interior layer 104.

In one or more embodiments, an enhanced hair covering system may protect the hair from being exposed to water by providing a waterproof exterior layer 102. The exterior layer 102 may be made of silicone or latex or other material that provides a waterproofing functionality. Without the interior layer 104, the exterior layer 102 by itself may pull on the hair of the user 110 and result in a painful experience either when putting on or removing a hair cap made of silicone or latex alone. Therefore, a product made only of silicone or latex on its own may be non-practical for daily use when individuals expect to look presentable after performing activities that include coming in contact with water.

In one or more embodiments, an enhanced hair covering system may facilitate protecting the hair of the user 110 by incorporating the interior layer 104. The interior layer 104 may be made of a material that allows for easy usage of the enhanced hair covering 100 when covering the hair of user 110. The material of the interior layer 104 may be silk, satin, wool, cashmere, or any type of material that provides a soft feel and insulation. Because of the softness of the interior layer, the user 110 may be able to put the enhanced hair covering 100 on their head with ease and comfort and not cause hair pulling or discomfort. This would also provide the user 110 with ease of removal of the enhanced hair covering 100 due to the interior layer 104 being made of any of the material listed above.

In one or more embodiments, an enhanced hair covering system may include an elastic band 120 that may be made up of one or more individual rubber rings that go around the interior of the enhanced hair covering 100. In some embodiments, the elastic band 120 may only cover one or more portions of the circumference of the interior of the enhanced hair covering 100. For example, it may be on the interior of the enhanced hair covering 100 but on portions that touch the skin of the user 110. In some other examples, the elastic band 120 may be on the entire circumference of the interior of the enhanced hair covering 100. The elastic band 120 may have a height and a width. The height may be selected in the enhanced hair covering system in order to present a mechanism to block airflow and/or water from going back into the enhanced hair covering 100 but allowing airflow to come out of the enhanced hair covering 100. This way, the user 110 may place the enhanced hair covering 100 on their head, then press around the exterior layer 102 in order to push out any trapped air generating an airflow out of the interior of the enhanced hair covering 100. This may result in a suction effect such that airflow is relieved from the interior of the enhanced hair covering 100 but prevents the reverse from happening. The resulting effect is that water or air is kept from going back into the interior of the enhanced hair covering 100. The elastic band 120 adds a non-slip additional barrier to keep water out while also allowing for air to easily be pushed out, and at the same time suctioning the area around the head to prevent air or water from entering the interior of the enhanced hair covering. In order to remove the enhanced hair covering, a user may lift the ribbed edging so that the airtight seal may be broken and air can enter the interior of the enhanced hair covering. The interior 104 may be made of a soft material would then allow the enhanced hair covering to be removed without causing hair pulling or discomfort.

It is understood that the above descriptions are for purposes of illustration and are not meant to be limiting.

Figure 2:
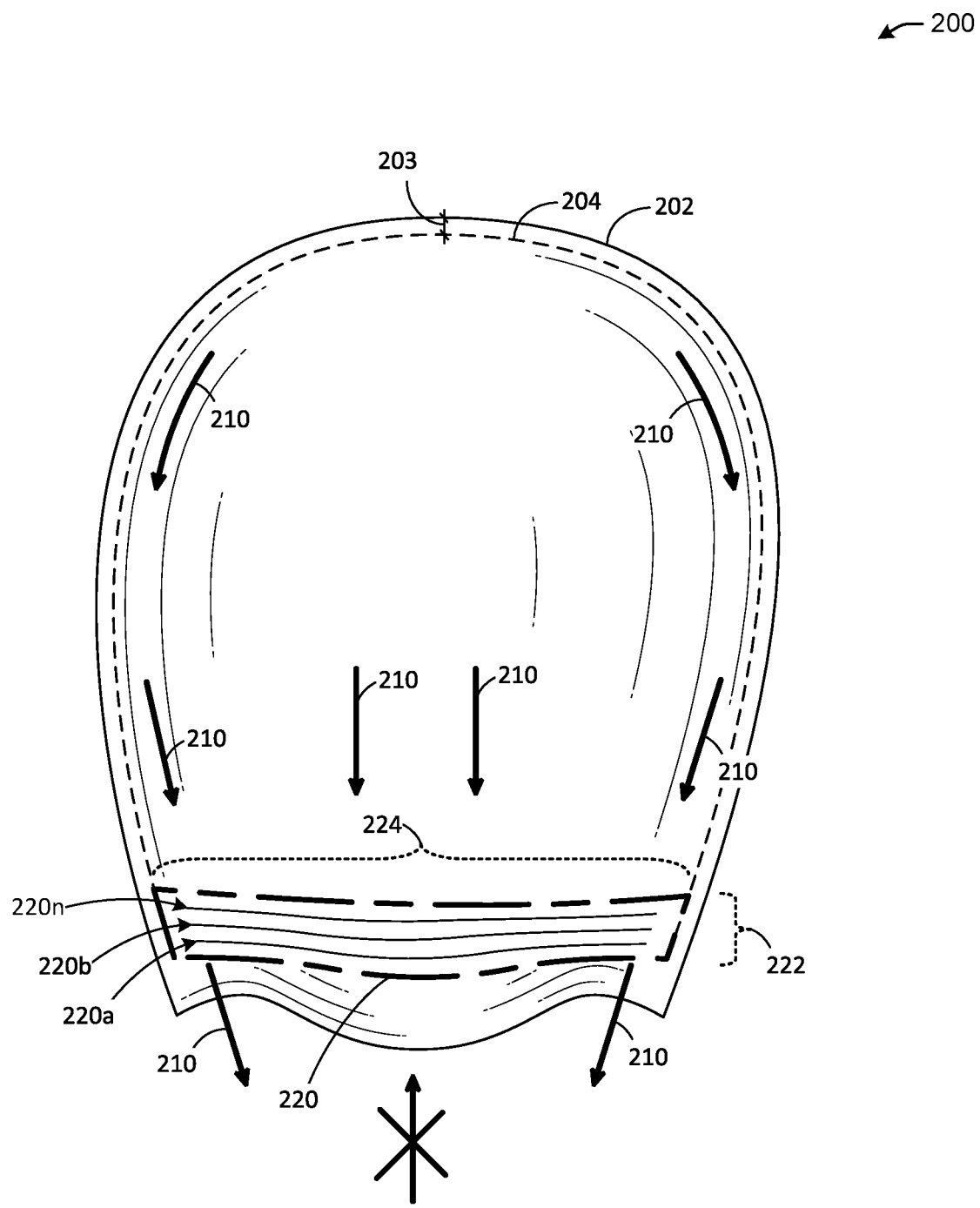
FIG. 2 depicts an illustrative schematic diagram for enhanced hair covering, in accordance with one or more example embodiments of the present disclosure.

FIG. 2 depicts an illustrative schematic diagram for enhanced hair covering, in accordance with one or more example embodiments of the present disclosure.

Referring to FIG. 2, there is shown an enhanced hair covering 200. One or more layers associated with the enhanced hair covering 200 may comprise an exterior layer 202 and an interior layer 204. In some examples, the interior layer 204 may be a lining of the exterior layer 202. In some other examples, there may be an intermediate layer 203 connecting the exterior layer 202 and the interior layer 204. The intermediate layer 203 may be a backing of the interior layer 204 to the exterior layer 202. For example, the intermediate layer 203 may be a layer of an adhesive that connects the exterior layer 202 and the interior layer 204. In some examples, the intermediate layer 203 may be a cushioning material. In some other examples, the intermediate layer 203 may be air that exists between the interior layer 204 and the exterior layer 202. This way, the interior layer 204 may move independently of the exterior layer 202. It should be understood that the above are only examples and other configurations between the exterior layer 202 and the interior layer 204 with or without the intermediate layer 203 may be envisioned.

In one or more embodiments, an enhanced hair covering system may protect the hair from being exposed to water by providing a waterproof exterior layer 202. The exterior layer 202 and may be made of silicone, or latex or other material that provides a waterproofing functionality.

In one or more embodiments, an enhanced hair covering system may facilitate protecting the hair of a user by incorporating the interior layer 204. The interior layer 204 may be made of a material that allows for easy usage of the enhanced hair covering 200 when covering the user's hair, such as silk, satin, wool, cashmere, or any type of material that provides a soft feel and insulation.

In one or more embodiments, an enhanced hair covering system may include an elastic band 220 that may be made up of one or more individual rubber rings (e.g., rings 220*a*, 220*b*, . . . , 220*n*, where n is a positive integer). The elastic band 220 may be a band that covers the circumference of the interior of the enhanced hair covering 200. The elastic band 220 may have a height 222 and a width 224. The width 224 may go around the entire circumference of the interior of the enhanced hair covering 200 or may cover one or more portions of the interior of the enhanced hair covering 200. The height 222 may be selected in the enhanced hair covering system in order to present a mechanism to block airflow and/or water from going back into the enhanced hair covering 200 but allowing airflow 210 to come out of the enhanced hair covering 200.

In one or more embodiments, a user may press around the exterior layer 202 in order to push out any trapped air generating and airflow 210 out of the interior of the enhanced hair covering 200, resulting in a suction effect such that airflow 210 is relieved from the interior of the enhanced hair covering 200. The resulting effect is that water or air is prevented from going inside the enhanced hair covering 200 in the door first direction. The elastic band 220 generates an airtight fitting when used by a person.

In one or more embodiments, the elastic band 220 may add a non-slip additional barrier to keep water out while also allowing for air to easily be pushed out, and at the same time suctioning the area around the head to prevent air or water from entering the interior of the enhanced hair covering.

It is understood that the above descriptions are for purposes of illustration and are not meant to be limiting.

FIGS. 3A-3D depict illustrative schematic diagrams for enhanced hair covering, in accordance with one or more example embodiments of the present disclosure.

Figure 3A:
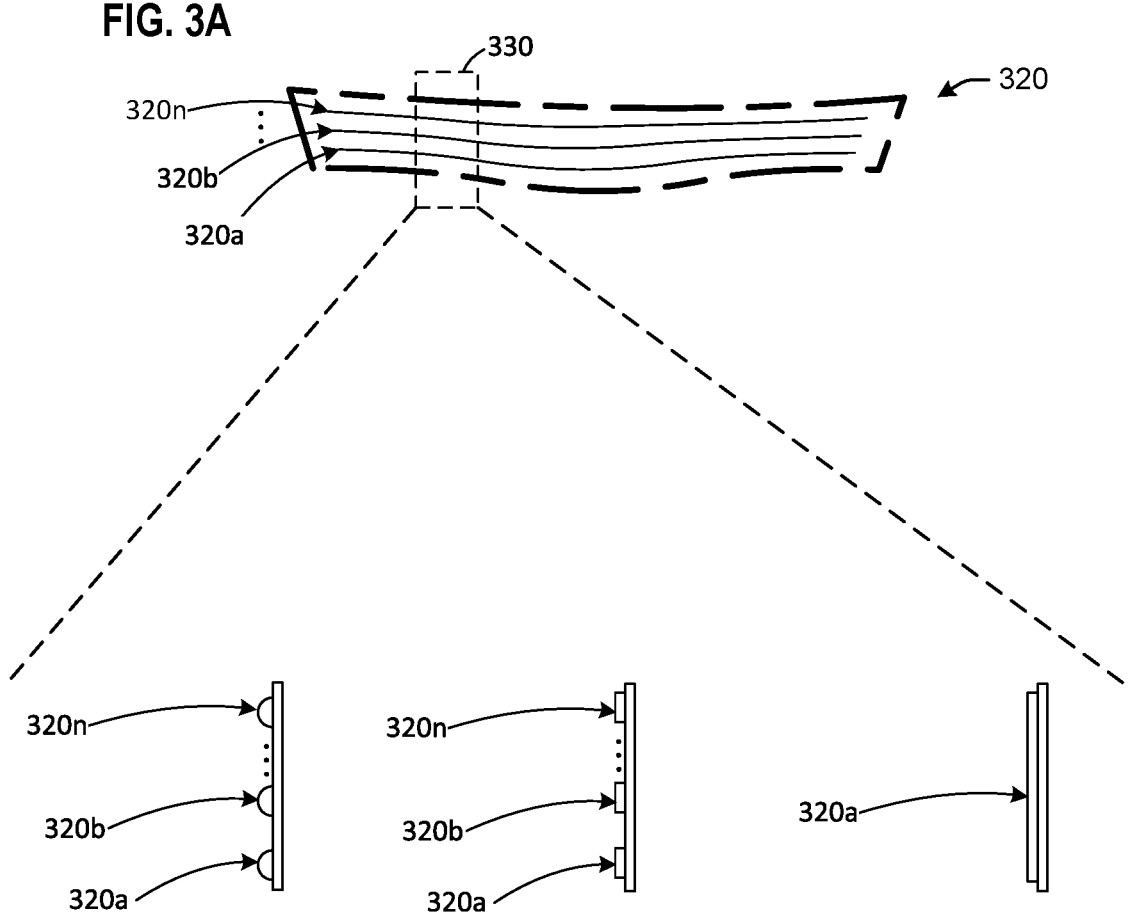
FIGS. 3A-3D depict illustrative schematic diagrams for enhanced hair covering, in accordance with one or more example embodiments of the present disclosure.

Referring to FIG. 3A, there is shown a band 320 that may be attached to the interior of an enhanced hair covering (e.g., enhanced hair covering of FIG. 2). The band 320 may comprise one or more elastic rings (e.g., rings 320a, 320b, . . . , 320n, where n is a positive integer) that adhere to the user's head in order to create an airtight seal preventing air or water to seep back into the interior of the enhanced hair covering.

In one or more embodiments, the band 320 may cover one or more portions of the interior of the enhanced hair covering or may cover the entire circumference of the interior of the enhanced hair covering. Looking at a cross-section 330 of the band 320, the configuration and/or the shape of the one or more elastic rings may be seen.

Figure 3B:
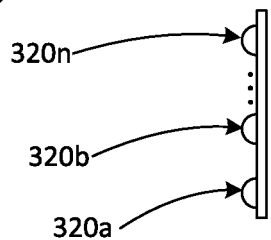

Referring to FIG. 3B, there is shown the cross-sectional result of cross-section 330 of a first configuration. In this configuration, the one or more elastic rings 320a, 320b, . . . , 320n are shown to have a round edge.

Figure 3C:
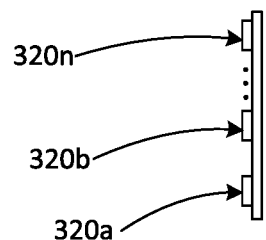

Referring to FIG. 3C, there is shown the cross-sectional result of cross-section 330 and a second configuration. In this configuration, the one or more elastic rings 320a, 320b, . . . , 320n are shown to have a rectangular shape having a flat edge. Although the examples of FIG. 3B and FIG. 3C shows two configurations, it should be understood that other configurations of the elastic rings 320a, 320b, . . . , 320n may be envisioned. For example, each of the rings would be concave, convex, or other shapes.

Figure 3D:
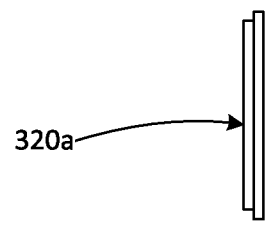

Referring to FIG. 3D, there is shown the cross-sectional result of cross-section 330 of a third configuration. In this configuration, the band 320 may be one continuous and flat surface 320a without rings. It should be understood that this configuration is only for illustrative purposes and that other configurations may be envisioned.

When the one or more elastic rings of FIGS. 3B and 3C or the flat surface of FIG. 3D are in contact with the head of the user, they create an airtight seal in order to prevent water or air from coming back into the enhanced hair covering. The user may push out the air by pressing across the outer surface of the enhanced hair covering, forcing the airflow out of the interior of the enhanced hair covering. The band 320 creates a suction effect against the head of the user in order to prevent air from coming back into the interior of the enhanced hair covering. When the user wishes to remove the enhanced hair covering, the user may relieve the suction effect by lifting the band 320 to disconnect the connection with the user's head. This will allow air to come under the enhanced hair covering and therefore can be easily removed considering that the interior layer of the enhanced hair covering comprises a material that does not cause hair pulling or discomfort when removing the enhanced hair covering.

It is understood that the above descriptions are for purposes of illustration and are not meant to be limiting.

Figure 4A:
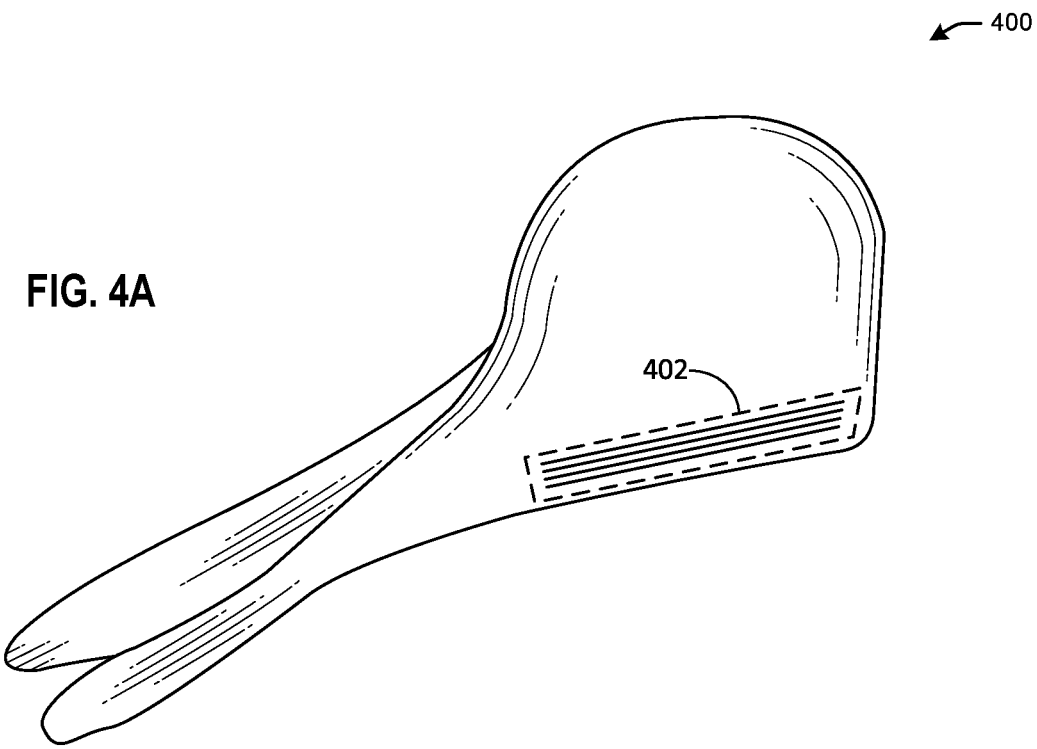
FIGS. 4A-4B depict illustrative schematic diagrams for enhanced hair covering, in accordance with one or more example embodiments of the present disclosure.
Figure 4B:
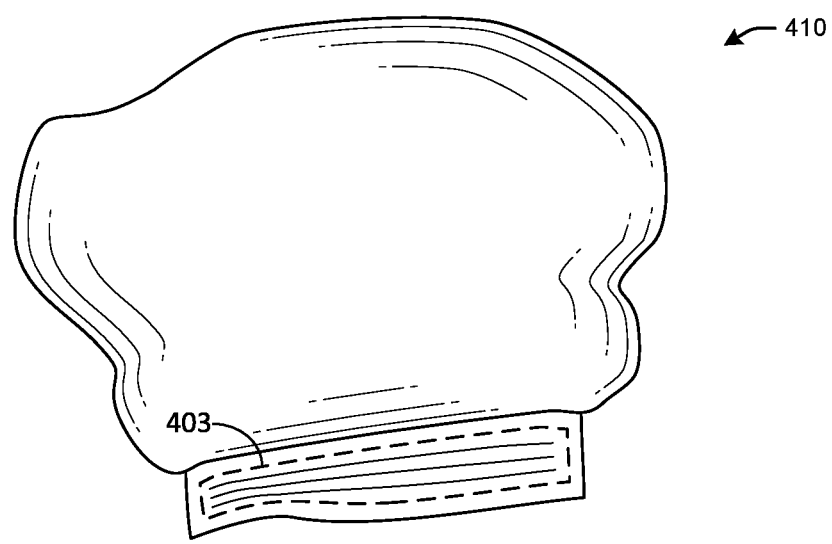

FIGS. 4A-4B depict illustrative schematic diagrams for enhanced hair covering, in accordance with one or more example embodiments of the present disclosure.

Referring to FIG. 4A, there is shown a variation of the enhanced hair covering 400 for a silk wrap scarf. In this example, the enhanced hair covering 400 comprises the elastic band 402 that may be positioned on the interior of the silk wrap scarf. The elastic band 402 may wrap around the interior circumference of the silk wrap scarf for a predetermined thickness. Referring to FIG. 4B, there is shown a variation of the enhanced hair covering 410 of a hair bonnet. Similar to FIG. 4A, the hair bonnet may comprise an elastic band 403 that may be positioned on the interior of the hair bonnet, creating a seal when the user wears the hair bonnet. The elastic band 403 may wrap around the entire hair bonnet on the interior surface of the hair bonnet or may cover certain parts or portions of the interior circumference of the hair bonnet.

It should be understood that the above variations are only given for illustrative purposes and that other hair coverings may benefit from the use of the one or more embodiments of this disclosure.

It is understood that the above descriptions are for purposes of illustration and are not meant to be limiting.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Embodiments according to the disclosure are in particular disclosed in the attached claims directed to a device, a system, and an apparatus. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The processes described and shown above may be carried out or performed in any suitable order as desired in various implementations. Additionally, in certain implementations, at least a portion of the processes may be carried out in parallel, creating a co-existence use case. Furthermore, in certain implementations, less than or more than the processes described may be performed.

Certain aspects of the disclosure are described above with reference to flow diagrams of methods, apparatuses, or computer program products according to various implementations. It will be understood that one or more blocks of the flow diagrams, and combinations of blocks in the flow diagrams, can be implemented by computer-executable program instructions. Likewise, some blocks of the flow diagrams may not necessarily need to be performed in the order presented, or may not necessarily need to be performed at all, according to some implementations.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

The invention claimed is:

1. A hair covering device comprising:
a first outer layer made of a first material type;
a second inner layer disposed inside the first layer, wherein the second layer is made of a second material type; and
an elastic band situated on an interior of the hair covering device at a first edge wherein the elastic band comprises a plurality of rings, wherein a first ring and a second ring are situated at a first distance from each other, wherein a third ring is situated at a second distance from the second ring, wherein the first ring, the second ring, and the third ring are situated in an uninterrupted consecutive order, wherein the second distance is greater than the first distance, and wherein the elastic band permits air out of the hair covering device while preventing air from flowing back into the interior of the hair covering device.

2. The hair covering device of claim 1, wherein the first material type is waterproof material.

3. The hair covering device of claim 1, wherein the second material type is a soft material.

4. The hair covering device of claim 1, wherein the first layer comprises latex or silicone.

5. The hair covering device of claim 1, wherein the second layer comprises at least one of silk, satin, wool, or cashmere.

6. The hair covering device of claim 1, wherein the hair covering device comprises at least one of a swim cap, a hair bonnet, or a wrap scarf.

7. The hair covering device of claim 1, wherein each ring of the plurality of rings is made of elastic material, and wherein each ring of the plurality of rings has a curved outer surface or a flat outer surface.

8. A hair covering system comprising:
an exterior layer made of a first material type;
an interior layer disposed on the interior of the exterior layer, wherein the interior layer is made of a second material type;
a middle layer disposed between the exterior layer and the interior layer; and
an elastic band situated on a perimeter of the interior layer at an opening of the hair covering system, wherein the elastic band comprises a plurality of rings, wherein a first ring and a second ring are situated at a first distance from each other, wherein a third ring is situated at a second distance from the second ring, wherein the first ring, the second ring, and the third ring are situated in an uninterrupted consecutive order, wherein the second distance is greater than the first distance, and wherein air is pushed out of the interior of the hair covering system by a pressure applied on the exterior layer, and wherein air is prevented from flowing back into the interior of the hair covering system.

9. The hair covering system of claim 8, wherein the middle layer introduces a separation between the exterior layer and the interior layer or an adhesive connecting the exterior layer to the interior layer.

10. The hair covering system of claim 8, wherein the first material type is waterproof material.

11. The hair covering system of claim 8, wherein the second material type is a soft material.

12. The hair covering system of claim 8, wherein the exterior layer comprises latex or silicone.

13. The hair covering system of claim 8, wherein the interior layer comprises at least one of silk, satin, wool, or cashmere.

14. The hair covering system of claim 8, wherein the hair covering system is at least one of a swim cap, a hair bonnet, or a wrap scarf.

15. The hair covering system of claim 8, wherein the elastic band comprises the plurality of rings, wherein each ring of the plurality of rings is made of elastic material, and wherein each ring of the plurality of rings has a curved outer surface or a flat outer surface.

16. A hair covering apparatus comprising:
a first outer layer made of a first material type;
a second inner layer disposed inside the first layer, wherein the second layer is made of a second material type; and
an elastic band situated on an interior of the hair covering apparatus at a first edge, wherein the elastic band comprises a plurality of rings, wherein a first ring and a second ring are situated at a first distance from each other, wherein a third ring is situated at a second distance from the second ring, wherein the first ring, the second ring, and the third ring are situated in an uninterrupted consecutive order, wherein the second distance is greater than the first distance, and wherein the elastic band permits air out of the hair covering apparatus while preventing air from flowing back into the interior of the hair covering apparatus.

17. The hair covering apparatus of claim 16, wherein the first material type is waterproof material.

18. The hair covering apparatus of claim 16, wherein the second material type is a soft material.

* * * * *